United States Patent [19]
Esser

[11] 3,961,474
[45] June 8, 1976

[54] METHOD AND APPARATUS FOR THE MANUFACTURE OF CHAINS WITH ROUND LINKS, HAVING VARYING MECHANICAL CHARACTERISTICS

[75] Inventor: Paul Esser, Cologne, Germany

[73] Assignee: Meyer, Roth & Pastor Maschinefabrik GmbH, Cologne, Germany

[22] Filed: Aug. 28, 1974

[21] Appl. No.: 501,369

[30] Foreign Application Priority Data
Aug. 28, 1973 Germany............................ 2343266
Aug. 28, 1973 Germany............................ 2348851

[52] U.S. Cl..................................... 59/23; 59/27; 59/35 R
[51] Int. Cl.² ......................................... B21L 1/02
[58] Field of Search ............... 59/18, 22, 23, 24, 25, 59/27, 35, 1, 16, 84, 78

[56] References Cited
UNITED STATES PATENTS

| | | | |
|---|---|---|---|
| 1,340,639 | 5/1920 | Weinacker | 59/25 |
| 1,438,474 | 12/1922 | Berg | 59/23 |
| 3,431,723 | 3/1969 | Wattler | 59/25 |
| 3,714,776 | 2/1973 | Lange | 59/23 |

FOREIGN PATENTS OR APPLICATIONS

| | | | |
|---|---|---|---|
| 2,113,771 | 10/1972 | Germany | 59/22 |
| 240,170 | 10/1911 | Germany | 59/25 |
| 280,445 | 11/1914 | Germany | 59/23 |
| 441,174 | 3/1927 | Germany | 59/25 |
| 941,597 | 4/1956 | Germany | 59/84 |
| 1,246,365 | 8/1967 | Germany | 59/25 |
| 2,032,692 | 1/1972 | Germany | 59/22 |
| 230,473 | 3/1925 | United Kingdom | 59/16 |

*Primary Examiner*—C.W. Lanham
*Assistant Examiner*—Gene P. Crosby
*Attorney, Agent, or Firm*—Holman & Stern

[57] ABSTRACT

A method for producing a link chain in which some of the links have deformation characteristics differing from other links, and apparatus for producing the link chain in which stock material having the different deformation characteristics are sequentially fed to a link-forming means from flanking magazines. In a modified form means are provided for severing stock lengths from a continuous wire on either side of the link-forming means.

5 Claims, 5 Drawing Figures

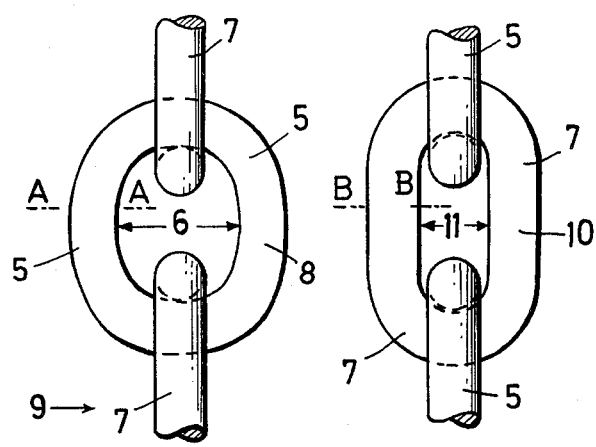
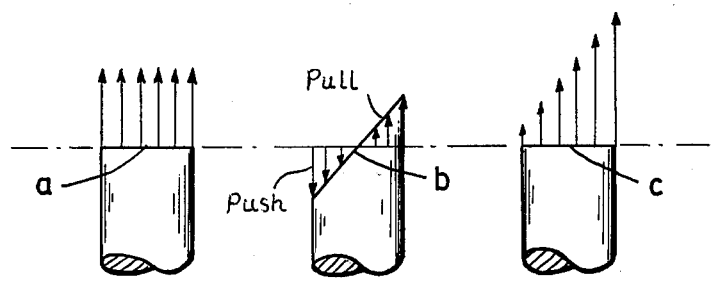

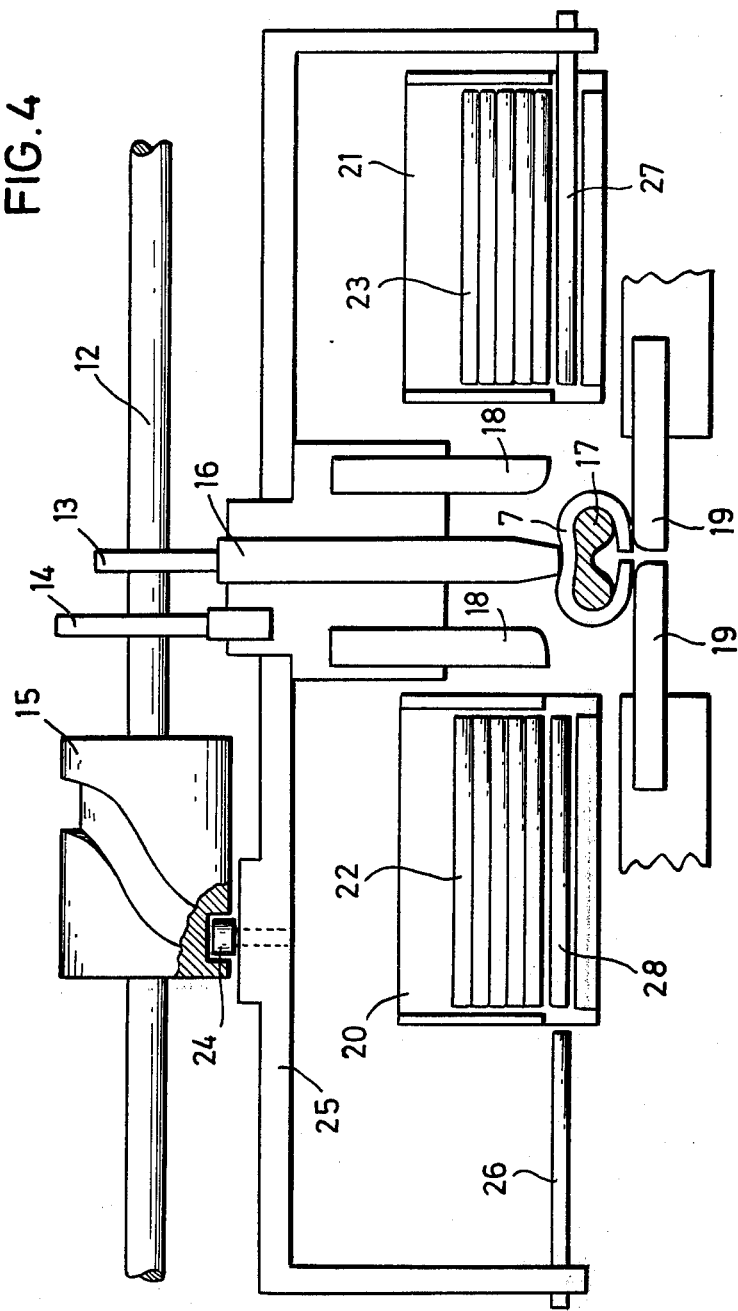

METHOD AND APPARATUS FOR THE MANUFACTURE OF CHAINS WITH ROUND LINKS, HAVING VARYING MECHANICAL CHARACTERISTICS

FIELD OF THE INVENTION

The instant invention concerns a method for manufacturing chains having round links, wherein a portion of the chain links have different mechanical characteristics and/or form and/or comprise different raw materials.

BACKGROUND OF THE INVENTION

For force-stressed chains with round links, there develops in many instances the function of not only having to withstand a tensile load but the chains must, to a special degree, also be wear-resistant. This is true for chains which are utilized in the mining industry, or for use as snow chains for vehicle tires, etc. Herein, what is meant by the special stresses, is not the common stresses on chain links at their opposite points of connection or by drive-means such as chain wheels, but what is meant are the stresses in excess of normal stresses, namely, those stresses which affect the chains. Among these types of stresses on a chain, for example, is a suddenly applied load, such as that which is caused during the towing of a vehicle by means of a tow-truck, etc. These problems are solved with chains in which all chain links, for example, are provided with the identical shape for technical consideration, whereby, however, for example alternate links, each second, fourth, sixth or each fourth, eighth or twelfth chain link is manufactured of a more expensive composition having a high tensile strength and greater expandability, than the remainder of the chain links which are produced from a more economical raw material, i.e., composition, having a high tension-stability but a comparatively lower expandability. With such type of chain, sudden longitudinal stresses can also be tolerated. By means of the selection of the composition, as well as the number of the chain links produced from the special material having a high expandability factor, it is possible to establish the desired or acceptable expandability for most extreme conditions.

BRIEF SUMMARY OF THE INVENTION

It is the scope of the instant invention to provide a method of manufacturing such a type of chains with round links in an automated process of production. This problem is inventively solved in that the chain link bending apparatus — according to the predetermined series of the varying chain links — is supplied with the material to be connected into a chain, at least partially in the form of wire. With the assistance of this method, it becomes possible, for example, to produce the above-described chains from continuous wire-metal, or, from pre-formed wire-pins comprising materials with varying mechanical characteristics, for example, varying elasticity, or varying wear-resistances, whereby, according to the requirements, each second, fourth, sixth, eighth etc., i.e., respectively even-numbered or alternate chain links, are manufactured from a raw material having a higher elasticity and/or a higher wear-resistance than other links.

The system of the instant inventive method further proposes that some of the chain links, preformed, are moved to a bending apparatus and in accordance to the predetermined series, the other chain links are bent by the bending apparatus out of wire into the pre-formed links. With the use of the method, it becomes possible to insert or include chain links which are manufactured out of a different material, or which are continuously already manufactured by means of a different method, during the manufacturing process into a chain of round links.

The instant invention concerns further an apparatus for performing the instant method with the aid of a chain-working machine, especially a chain-link-bending machine, whereby feeding magazines are arranged for the varying pins or link types, and a respective supply or feed-in device, which is adjustable so as to operate in the working cycle, is provided for each magazine. With the aid of this inventive apparatus it is possible, according to a special method, to bend or form pre-fabricated chain links, or prefabricated chain links comprising a special composition, or having a special shape, according to a predetermined chain link distance, into a common round-link chain. Instead of a prefabricated chain link it is also possible to insert into the second magazine a wire-pin comprising the desired special raw material, which is then bent in the same bending direction as chain links of the common composition, and which is connected with the remaining chain links according to the predetermined series.

In a different inventive embodiment for performing the method, an apparatus is proposed which is characterized by two prior art wire feeding devices which operate alternately and in counter-stroke (push-pull) manner in accordance to the predetermined chain-link series. The advantage of this embodiment is in that all chain links, i.e., those comprising common composition, as well as those comprising the desired special composition, can be manufactured from the continuous wire.

In one of the embodiments of the instant invention, it is positioned that the wire feed-in devices are proposed at the opposite sides of the bending mandrel. In a further, advantageous embodiment of the instant invention, it is proposed that the wire feed-in devices are arranged side-by-side at the same side of the bending mandrel, and that at least a cross-feed-in device to the bending mandrel is proposed for the pins of one wire feed-in device for those pins which are cut off or separated from the continuous wire. In such type of apparatus, and based on an already existing machine construction, it is possible, for example, to produce an apparatus for performing the inventive method by means of grippers which are relatively simple to install and to connect to the existing control device. In the process of the instant inventive method, it is finally proposed that the wire feed-in means are arranged side-by-side at the same side of the bending mandrel and are adjustably retained transverse to the wire-feed-in direction and in a predetermined working stroke. This embodiment of the instant invention requires a more complicated construction and greater expenditure for the guidance means of the wire-feed-in means transverse to the direction of the wire-feed-in device, however, it has the advantage that the predetermined alignment of the wire up to the beginning of the bending process, is retained, since the wire-end which is guided into the bending device, is already held by the holding device, etc., which is connected with the bending apparatus, before the wire-end is separated from the continuous wire.

The advantage of utilizing two magazines as well as two wire feed-in means permits the use of varying pin lengths or varying pin strengths in addition to varying compositions of the chains in which all of the links are bent out of the pins, so that there results a complete chain in which, according to the predetermined chain link distance, there is always one chain link with a deviating chain link size.

The arrangement of a magazine on a chain link bending machine is known in the prior art, however, it has never before been taught to utilize such types of magazines for manufacturing a chain with varying types of chain links whereby the deviating types of chain links can always be of varying shape and/or composition.

Similarly, wire feed-in means for chain link bending machines are in and of themselves known in the prior art, whereby these wire feed-in means may be provided with sliding carriages, roll straightening systems, ride-along clamps, fixed clamps, cutting devices and, as the case may require, they may be provided with a pre-switched so called "nicking" device. The characteristics of the instant inventive device lies, however, in the special arrangement of the wire-feed-in means. The instant invention is described in greater detail by means of the schematic illustrations of embodiments, wherein:

BRIEF DESCRIPTION OF THE DRAWINGS

FIG. 1 represents a top plan view of a sectional cross-cut at a special chain of a most simple type with a top view of the circular, form-elastic chain links;

FIG. 2 is similar to FIG. 1 showing a top view of alternate chain links with straight side pieces;

FIG. 3 shows tension/compression diagrams a and b corresponding to stresses on sections A—A and B—B of FIGS. 1 and 2, respectively, and c which theoretically illustrate the stresses when diagrams a and b are overlapped;

FIG. 4 is a diagrammatic plan view of one form of an apparatus for bending special chain links and utilization of two supply magazines.

DESCRIPTION OF THE PREFERRED EMBODIMENTS

Figure 5:
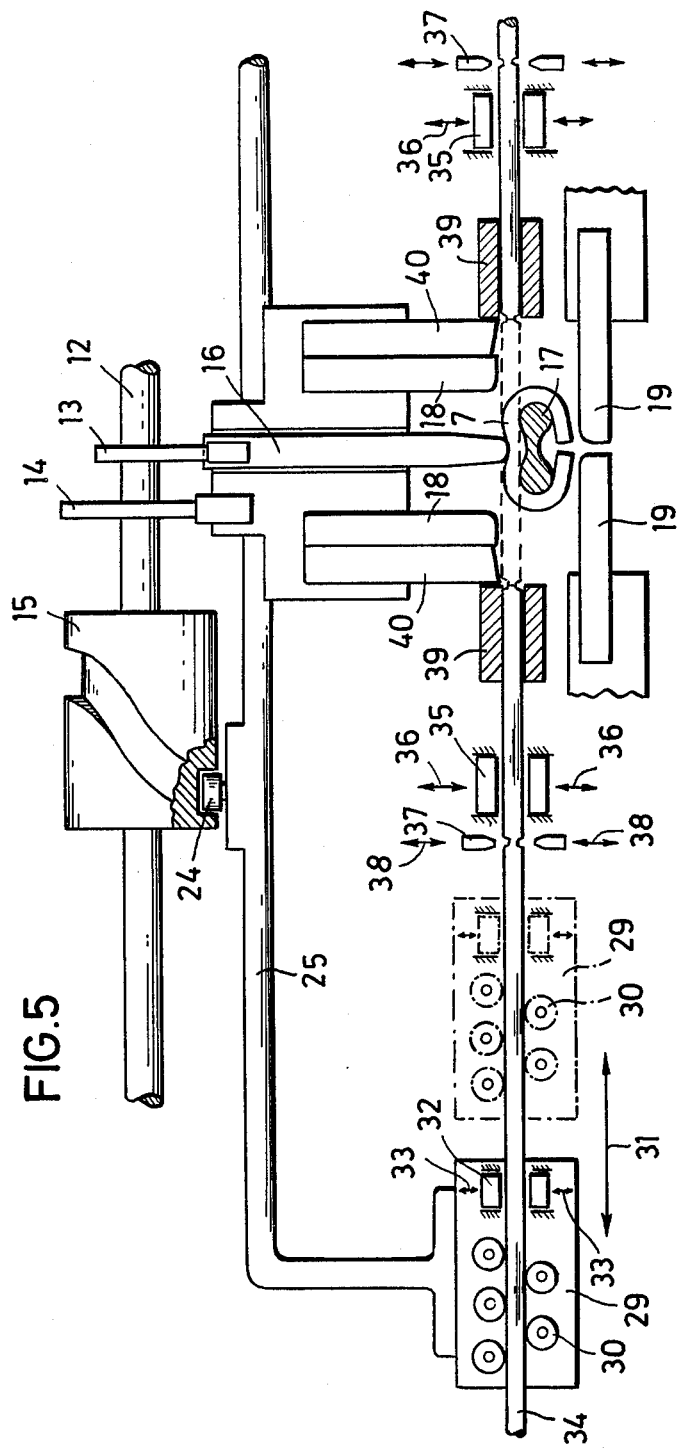
FIG. 5 shows the apparatus similar to FIG. 4 with two wire-feed-in means.

FIG. 1 shows a top view of an elastic chain link 5 of a special chain having an inner shank distance 6 which is only slightly smaller than the inner length of the link, as well as the adjacent common chain links 7, provided with straight generally parallel, or sides; it is essential that the shanks, i.e., sides 8 of the chain link 5 are clearly arcuate.

FIG. 2 shows the corresponding view in the direction of the arrow 9 towards the normal chain link 7 with two adjacent resilient chain links 5. It is clearly seen that the straight lines of the shanks 10 have a substantially smaller distance 11 than the shanks 8 of the resilient chain links 5. Thus, in the manufacture utilizing the identical compositions, there results a greater form-resilience for a chain according to FIGS. 1 and 2 then for chains which are formed only from the common chain links 7. Instead of a resilient chain link with a form which deviates from the form of the normal chain links, in such types of special chains, there may be utilized also chain links of the identical form, whereby, however, the resilient chain links are manufactured from a different composition. This provides the advantage that the special chain links can be manufactured on the same bending mandrel as the common links. In the same manner, instead of the resilient chain links 5, there may be utilized, for example, prefabricated chain links with a cross-piece welded therein, so that, deviating from the described example, the special chain links are inflexible and the conventional chain links to be formed on the chain link bending machine comprise the resilient chain links.

FIG. 3 shows the stress forms for the special chain shown in FIGS. 1 and 2, whereby the diagram 3a shows the stress without deformation on Section A—A according to FIG. 1 and for the section B—B according to FIG. 2.

FIG. 3b shows the tension/compression-diagram when there results no stress but only an assumed deformation of the resilient chain link. In this case, there develop the stress-distributions, according to diagram 3b, in the section A—A on the basis of the bending moments.

FIG. 3c shows, in contrast thereto, the stress on the resilient chain link with deformation, which results from an overlapping of FIGS. 3a and 3b. In contrast to the non-elastic link, there appears a higher top-stress which determines the basic stressability of the chain link and therewith the stressability of the total chain.

FIG. 4 shows diagrammatically one novel form of the apparatus for manufacturing the special chains. In this apparatus, a main shaft 12 drives two cam discs 13 and 14 as well as a cylindrical cam 15. The cam disc 13 operates in a common manner a holder means 16 for the chain link 7 which is to be bent, and which is curved around a bending mandrel 17 of prior art construction by means of pre-bending dies 18 and lateral bending dies 19. The pre-bending dies 18 are operated by means of cam 14; the operating of the lateral bending dies 19 is made by means of common actuator means (not shown), with their sequence of movement being coordinated with the movement of the remaining tools of the bending apparatus by way of respective control devices.

According to the instant inventive apparatus, two magazines 20 and 21 are proposed in which are stored the pins 22 or 23 of different compositions, but having identical dimensions, i.e., lengths and wire-diameters.

According to the instant invention, the cylindrical cam 15 operates an adapter frame 25 which is of forked or bifurcated shape, under interpolation of a roller 24; the adapter frame 25 being provided with two generally opposed projections 26 and 27. The projection 27 has pushed the chain link 7 forward toward mandrel 17 (as shown in FIG. 4) and is disposed in the magazine 21. During the next working stroke, the projection 26 outside of magazine 20 will accordingly push the pin 28 out of magazine 20 into the direction of the bending mandrel 17 for bending it into a chain link comprising a different composition, but having the identical form. The chain manufactured by the above-described apparatus accordingly comprises alternate different chain links. With a respective constructive alteration of the projection means, it is also possible, for example, at first to consecutively produce three chain links out of the pins from magazine 20, and then to manufacture each respective fourth chain link from the pins from magazine 21. Such a procedure requires only a separation of the two projection means from each other, and modification of a cylindrical control cam for each one of the projector means which are activated by means of a respective control gear which is in communication with the activating shaft 12.

The bending apparatus according to FIG. 5 corresponds to a great extent to the bending device according to FIG. 4, whereby identical reference numerals have been used for the identical parts. The cylindrical cam 15 activates hereby a projection frame 25 over the roller 24, and whereby the projection frame 25 has a forked shape. In this embodiment, however, the projection frame is provided with a sliding carriage 29, a roller-adjustment system 30, a clamp 32 which moves along with the roller adjustment system in the direction of the double arrow 31; the shanks of the clamps securely clamping the wire 34 in the sense of the double-arrow 33 with the schematic diameter of the wire being greatly enlarged, as well as a fixedly positioned clamp 35 with the shanks moving in the sense of the double-arrow 36. Furthermore, there is provided a so called "nicking" device 37 which is also immovable in the longitudinal direction of the wire-feed-in means, with its dies being movable in the sense of the double-arrow 38. The apparatus is completed by a guiding sleeve 39 and a cutting knive 40 which is arranged to be movable in conjunction with the bending dies 18.

On the other side of the bending mandrel 17 is arranged a device which is constructed in accordance with said mandrel and connected with the projection frame 25, said device is not completely illustrated for reasons of simplicity, so that, according to the given problem of the instant invention, the bending mandrel is provided at its right side with a type of wire which differes in composition from the type of wire which is guided to the mandrel from the left, and again, as in the above embodiment, a special chain with alternately varying chain links can be manufactured from continuous wire.

The apparatus functions in a manner so that during a movement of the projection frame 25 to the right, i.e., towards the bending mandrel 17, the clamp 32, which was moved in direction 31, closes, and the slide carriage 29 moves into the position illustrated by the broken line. Thereafter, the stationary clamp 35 closes; simultaneously, the wire is "nicked" according to the predetermined length of the pin by means of a "nicking" device 37. Consecutively, the sliding carriage slides back when clamp 35 is closed and clamp 32 is open, in order to move again in the direction of the bending mandrel during the following working stroke. During the repeated process, the pin end, which is located in the guide sleeve 39, is moved into the position shown by the broken line, via the bending mandrel 17, hereby the holder 16 is lowered first in accordance with the contour of the cam disc 13; then, in cooperation with the guide sleeve 39, the wire pin is cut off by means of cutter 40 at the point which had previously been "nicked" and is then pre-bent into the C-shape by means of the pre-bending dies 18. Thereafter, the chain link is closed by means of the lateral bending dies 19 to an extent so that a link which was prepared in the previous working stroke can be inserted through the remaining narrow slot. The chain link is then completely closed by means of a bending- or rolling-device which is not illustrated in detail.

The wire-feed-in devices located at the right side of the bending apparatus, are not shown in detail, and function in the identical manner so that according to the working stroke determined by the cylindrical cam 15, alternately each pin is separated from the left and then from the right wire-end and is shaped into a chain link whereby each respective link which is to be bent, is consequently linked with the chain link manufactured during the previous working stroke.

As in the embodiment of FIG. 4, in FIG. 5 the series of the varying chain links may be altered by means of a respective change of the control for the wire-feed-in means, so that, for example, only each fourth chain link is separated from the strand of wire coming from the right, while three consecutive chain links from the left wire strand are produced. The change in the control device for the wire-feed-in is made with means known to anyone with knowledge in this art.

In a still further embodiment, not illustrated, the two wire strands will not be oppositely positioned, as illustrated, but they are arranged side-by-side whereby either the wire-feed-in means themselves are fixedly arranged, whereby a wire-feed-in device is arranged so as to be precisely in the same plane of the bending mandrel, while in the second wire-feed-in device the pin, deviating from the prescribed mode of operation, is first separated from the wire end and is then guided to the bending mandrel transversely to the direction of the wire-feed-in direction. This may be accomplished, for example, by means of correspondingly movable clamps. The control of the wire-feed-in devices and, for example, the transport-clamp which is movably arranged transverse to the wire-feed-in direction, may be made in the identical manner by means of correspondingly constructed cylindrical cams.

In place of a movable cam according to a further embodiment of the instant invention, it is also possible to position the wire feed-in means to be movable themselves, whereby these are guided to be movable transverse to the wire-feed-in direction, so that always the currently operating wire-feed-in device is adapted to the operating position of the bending apparatus. The control is also here made with commonly known means. This embodiment has most of all the advantages that it is possible to change the series of working strokes in an especially simple manner, i.e., the series of the varying chain links, in a manner so that for example, only each forth, eighth, or twelfth chain link represents a special chain link. The control device for this embodiment may be either by mechanical means via cylindrical cams etc., or, at least for a part, for example for the transverse transport, be made by means of a special, for example, hydraulic or pneumatic moving-device, while the activation of the wire-feed-in device itself, as in the above-described example, is accomplished by means of a cylindrical cam.

The above-disclosed embodiments have been described on the basis of a bending apparatus through which chain links are manufactured, comprising varying compositions but having identical chain link shapes. Should one desire to produce a deviating form for the special chain links, then the chain link bending apparatus must be provided with respectively two movable mandrels. This is possible, however, only in form-deviations within certain limitations. If one utilizes especially strong form-deviations, then it will be more favorable to produce these individually on a separate chain link bending machine and then, according to the first embodiment, to feed-in the same via a magazine into the chain link processing machine for the manufacture of a special chain.

I claim:

1. A method for the manufacture of link chains having links consisting of C-shaped bent stock sections formed on a chain bending machine comprising, in combination, the steps of feeding a wire stock section in a longitudinal direction in front of a bending mandrel which is arranged vertically relative to the longitudinal feeding direction of the stock material; locking the stock material in a locking fixture which is advanced intermediately of the stock material and the bending mandrel, and positioning the locking fixture vertically relative to both the center position of the stock material and the front of the bending mandrel; bending the stock material by means of bending tools round the bending mandrel and forming the C-shape of a chain link, the improvement characterized in that the wire stock sections forming the C-shaped chain links are of different physical properties, and have different extensibility under tension, and feeding the different stock materials to the bending mandrel in a pre-selected and recurring sequence.

2. A chain link bending apparatus for the manufacture of link chains having links consisting of C-shaped bent wires, said apparatus comprising a feeding device for stock wire sections for feeding the wire sections in a longitudinal direction, a bending mandrel disposed vertically relative to the direction in which the stock section is fed; a locking fixture having means advancable towards the direction the stock material is fed and the bending mandrel; bending tool means for bending the wire stock material around the bending mandrel to form a C-shape, the improvement comprising stock material supply means having a different supply of stock sections with each of the stock sections having different physical characteristics including different extensibility under tension, and means for feeding the stock material to the bending mandrel in a pre-selected and recurring order.

3. The bending apparatus as claimed in claim 2 in which said stock material supply means comprises two separate magazines operatively connected and related to the bending mandrel and a corresponding set of bending tools for forming the C-shaped bent sections of the link-chain, said magazines each containing a supply of pins for forming a chain link, said pins having different physical properties, and feeding devices which engage the pins in the magazines and deliver them to the bending mandrel in a pre-selected and recurring order.

4. The bending apparatus as claimed in claim 3 in which said magazines are disposed on opposite sides of the bending mandrel.

5. The bending apparatus as claimed in claim 4 in which said means for delivering the pins comprises a reciprocating frame having opposed means at opposite ends respectively engageable in one of said magazines, said advancing frame alternately engaging in said magazines for delivering a pin to the bending mandrel.

* * * * *